Oct. 17, 1967  J. H. BREISCH  3,347,431
EXPLOSIVE ACTUATED PIPE CUTTER
Original Filed Feb. 12, 1964
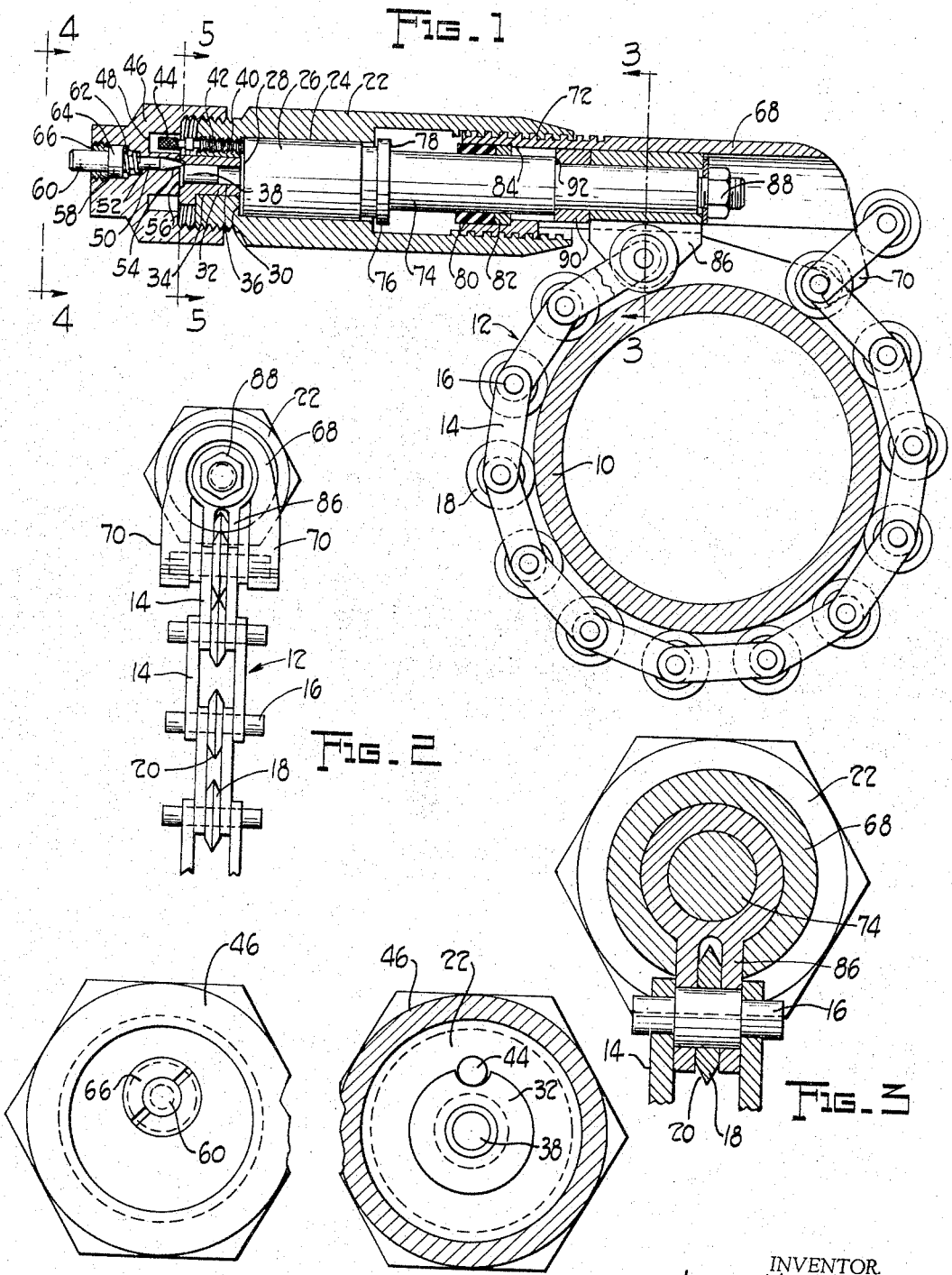
INVENTOR.
JOHN H. BREISCH
BY
ATTORNEY.

United States Patent Office 3,347,431
Patented Oct. 17, 1967

3,347,431
EXPLOSIVE ACTUATED PIPE CUTTER
John H. Breisch, Lakewood, Ohio, assignor to Cleveland-Detroit Corporation, Cleveland, Ohio, a corporation of Delaware
Continuation of application Ser. No. 344,467, Feb. 12, 1964. This application Mar. 7, 1966, Ser. No. 540,132
8 Claims. (Cl. 225—103)

This invention relates to pipe severing tools and more particularly to an explosive actuated tool capable of parting pipe and tubing which is frangible on impact.

This application is a continuation of my copending application Ser. No. 344,467, filed Feb. 12, 1964.

The invention disclosed herein is an improvement on the pipe cutting tool described in my copending application Ser. No. 200,564, filed on June 6, 1962.

An object of this invention is to provide a hand tool having parts engageable circumferentially with a brittle pipe, such parts including cutter elements which are driven into the pipe uniformly and instantaneously as a result of actuation by the detonation of an explosive charge.

Pipe cutters have long taken the form of a plurality of cutters carried in hand apparatus for producing indentations in the outer wall of a pipe either by rolling, chiseling, or the applying of enormous stresses to force the cutter into the pipe material. These prior systems required the application of forces in a series of independent cutting steps, the accumulative effect of which would result in the pipe fracturing at the desired circumferential line. In an effort to reduce the time involved in cutting the pipe, larger tools were built incorporating mechanical and hydraulic amplification in order that the user could apply the necessary force to accomplish the cutting.

The pipe cutter which is the embodiment of my invention overcomes the aforementioned problems by producing practically instantaneous cutting. The plurality of cutters is utilized and distributed around the pipe on the cutting line. A sudden and powerful force is applied to each cutter which drives the cutter into the pipe at great impact capable of fracturing the pipe along the line of the cutters.

The tool which produces this effect is physically small as compared to prior tools and can be readily held and controlled in one hand. The power required to fracture the pipe is produced by the explosion of a powder charge in a cartridge positioned in the breach of the tool. A piston and cylinder combination is associated with the breech in such a manner that the explosive force is applied to the piston head tending to shift the piston away from the cylinder head. The relative movement of the piston within the cylinder is transmitted to the ends of a flexible chain carrying a plurality of cutters. The effect of the explosives is an attempt to bring the ends of the chain together thus reducing the diameter of the circle defined by the chain. At the instant of explosion a large radial impact is produced at each of the cutters and is uniform throughout the circumference of the pipe by reason of the flexibility of the chain.

Smaller pipe with shorter chain and fewer cutters requires less force to accomplish the cutting than on larger diameter pipes with a longer chain involved and a greater amount of cutters being forced into the pipe wall. An adjustable stop positioned at the cylinder head manually controls the volume of the combustion chamber prior to the explosion. The force of the explosion applied to the piston is in inverse relation to the volume of the combustion chamber and by regulating the starting position of the piston, the cutting force available is also regulated. The advantage of this feature reflects itself in the adaptability of the tool to cut several sizes of pipe with a single-size explosive charge.

Accordingly, it is an object of this invention to provide a pipe cutting tool having a plurality of cutters and forcing the cutters into the pipe wall with great impact by instantaneous tension applied to a chain carrying the cutters.

A further object of the invention is to provide a powder actuated pipe cutter wherein a variable impact force applied to the cutters is available with the use of a single size load in a powder cartridge.

A still further object of my invention is to provide a pipe cutting tool actuated by an explosion wherein the tensioning of the flexible cutting element around the pipe to be cut simultaneously urges the operable parts of the tool into the maximum cutting force position prior to the detonation of the explosion charge.

Other objects and advantages more or less ancillary to the foregoing, and the manner in which all the various objects are realized, will appear in the following description, which considered in connection with the accompanying drawings, set forth the preferred embodiment of the invention.

In the drawings:

FIG. 1 is an elevational detail view with parts cut away for purposes of clarity showing the pipe cutter which is the preferred embodiment of my invention in readiness for operation;

FIG. 2 is an end view of the pipe cutter of FIG. 1;

FIG. 3 is a sectional view taken along line 3—3 of FIG. 1;

FIG. 4 is an end view showing the breech end of the pipe cutting tool as indicated by line 4—4 of FIG. 1; and FIG. 5 is a sectional view taken along line 5—5 of FIG. 1.

The preferred embodiment of my invention is illustrated as a complete assembly in FIG. 1 mounted on a pipe 10 of brittle and frangible material, to be severed along a circumferential line. A flexible chain 12 is placed in contact with the pipe 10 along the line at which the cut is to be made, the chain 12 having side links 14 and hinge pins 16. The pins 16 join the links 14 into a continuous flexible chain 12. On each pin 16 and disposed between the side links 14, a roller cutter 18 is rotatably mounted. The cutter 18 has a generally V-shaped cutting edge 20 for engagement with the pipe 10 or other material to be cut. The application of the cutter 18 to the work results in rotation and the presentation of a different portion of the cutter edge 20 thus distributing the wear. The pins 16 are in close fit with the links 14 and also the cutters 18 in order that the chain 12 may be non-extensible and each cutter 18 brought to bear on the pipe 10 with equal force.

In the pipe cutter illustrated in FIG. 1, tension is applied to the chain 12 by a piston and cylinder combination actuated by an explosion. A body 22 is hollow and elongated and forms the hand grip as well as carrying the operative parts of the pipe cutter as an assembled unit. A cylinder 24 is centrally located on the axis of the body 22, and receives a piston 26 for a sliding fit therein. Piston 26 has end 28 thereof confronting cylinder head 30 formed at one end of the body 22. A flanged breech plug 32 is positioned in a bore 34 which is formed on the axis of the body 22 and communicates with the cylinder 24. The breech plug 32 is provided with a bore 36 having a size and shape to accommodate the placing therein of a powder-loaded cartridge 38. Bore 36 also communicates with the cylinder 24 and the exploding of the powder in the cartridge 38 results in passing of the products of the explosion into the cylinder 24 and against the end 28 of the piston 26.

Adjacent bore 34 in the head 30, a threaded bore 40 is formed to provide an opening through the head 30 the axis of the bore 40 being generally parallel to the axis of cylinder 24. A threaded pin 42 is positioned in the bore 40 and has a knurled end 44, which is utilized to rotate pin 40 to achieve longitudinal movement thereof. By rotating the pin 42 the end thereof enters the cylinder 24 and engages the end 28 of the piston 26, thus forming a stop against which the piston 26 rests. Manual adjustment of the pin 42 by rotation thereof, varies the clearance space between the end 28 of the piston 26 and the cylinder head 30. By positioning the stop pin 42 in such a way that the clearing space is increased, the volume into which the explosive gases are transmitted is increased and the pressure developed thereby is decreased. Therefore, manual positioning of the pin 42 controls the force which is transmitted by the piston 26.

The cap 42 threadably mounted on the body 22 engages the breech plug 32 and holds the same seated in place in the bore 34. A cap 46 also engages the cartridge 38 and maintains the cartridge 38 seated in the bore 36. An annular groove 48, in the cap 42 receives the knurled end 44 of stop pin 42.

The cartridge 38 is detonated by a firing pin 50, which is positioned in a bore 52 formed through the cap 46. The bore 52 has a frusto-conical end 54, the small end of which is located adjacent to the rim of the cartridge 38 when the cap 46 is in place on the body 22. The firing pin 50 has a conical end 56, the angle of convergence of which is complementary to the angle of convergence of the frusto-conical end 54 of the bore 52. The tip of the firing pin 50 projects through the end of the bore 52 a distance sufficient to deform the cap of the cartridge 38 and cause the same to explode.

The firing pin 50 has a flange 58 formed thereon and an anvil 60 which extends beyond the end of the cap 46 which is adapted to be struck by a hammer or a hammerlike object to drive the firing pin 50 forward into firing position. A coil spring 62 lies between the flange 58 and a shoulder 64 formed in the bore 52. The spring 62 urges the firing pin 50 to a retracted position with the conical end 56 within the bore 52. The stop nut 66 is threaded into the outer end of the bore 52, circumscribes the anvil 50, and engages the flange 58. The stop nut 66 provides an adjustable stop against which the spring 62 forces the flange 58 and thereby determines the retracted position of the firing pin 50.

A hook body 68 is generally hollow and cylindrical and has a pair of spaced hooks 70 on the end thereof, the hooks 70 being arranged to engage the pins 16 outside the links 14. The hook body 68 is threadably joined to the body 22 by a coarse Acme thread 72. The thread 72 allows for the convenient adjustment of the location of the hook 70 in respect to the cylinder head 30. Clockwise rotation by body 22 causes the hook 70 to be brought closer to the cylinder head 30.

The piston 26 has a rod 74 integral therewith which extends along the center line of the cylinder 24 and projects into the hooked body 68. The piston rod 74 has a flange 76 thereon which presents a shoulder 78 for engagement with a rubber-like bumper sleeve 80 carried by the hook body 68. The bumper sleeve 80 provides a resilent stop for the piston 26 and piston rod 74 after the pipe is cut. The sleeve 80 is held in position by a spacer ring 82 having an inside diameter that is a slidable fit with the rod 74 and an outside diameter that is snug fit with the hook body 68, a shoulder 84 being provided on the hook body 68 to hold the spacer ring 82 in position.

A bifurcated yoke 86 is mounted on the rod 74 opposite to the piston end 28 and is removably held on the rod 74 by a threaded nut and washer assembly 88. A spacer 90 positions the yoke 86 on the rod 74 and lies between shoulder 92 formed on the rod 74 and the yoke 86. The yoke 86 is joined to the chain 12 as best illustrated in FIG. 3 wherein the bifurcated portion of the yoke 86 receives the pin 16 in the manner of a chain link, space being provided for a cutter 18.

In operation, the pipe cutter is placed on the pipe 10 to be cut by wrapping the chain 12 therearound at the circumferential line of fracture. The body 22 is rotated counter clockwise to extend the hook 68 outwardly a distance sufficient to allow the connection of the hooks 70 with an appropriate pin 16 and the chain 12. After the chain 12 is connected to the hook 70 the body 22 is rotated clockwise drawing the hooks 70 towards the yoke 86 until the chain 12 is in snug engagement with the pipe 10. This adjustment forces the piston 26 against the head 30 or the previously adjusted stop pin 42.

If the pipe 10 is of relatively small diameter, less force is necessitated to make the cut since fewer cutters are utilized. In this case, the stop pin 42 is rotated to stop the piston 26 with clearance space between the end 28 thereof and the cylinder head 30. The anvil 60 of the firing pin 50 is then struck with a hammer and the firing pin 50 causes the cartridge 58 to explode, the pressure providing an instantaneous force which actuates the piston rod 74 and draws the cutters 18 into the pipe 10, each cutter 18 making a cut into the pipe substantially uniformly and simultaneously. The impact of the cutters produces the fractures and the strain that separates the pipe along the line of engagement of the cutters 18. Further travel of the piston rod 74 is stopped by the shoulder 78 of the flange 76 coming to rest against the bumper sleeve 80 and the cutting operation is completed.

The cap 46 is then removed, and the expended cartridge 38 removed for replacement by a loaded cartridge 38. The stop pin 42 may then be adjusted for the next cut and the cap 46 replaced to hold the cartridge and breech plug 32 in place. The pipe cutter is then ready for repeating the process of cutting pipe as above described.

Having thus described this invention in such full, clear, concise, and exact terms as to enable any person skilled in the art to which it pertains to make and use the same, and having set forth the best mode contemplated of carrying out this invention, I state that the subject which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A pipe cutter comprising a plurality of sharp edge pressure elements adapted to be disposed in circumferential alignment about the circumference of a pipe, support means extending around said pipe and supporting said elements for movement simultaneously radially inwardly of said pipe to sever the pipe, first and second members connectable with said support means, means mechanically interconnecting said members to relatively move said members in the one direction to tighten said support means about said pipe and hold said elements in snug engagement with said pipe, and force generating means for applying a momentary impact force to said members with explosive-like suddenness to drive said members relative to each other in said direction to suddenly move said elements radially inwardly of said pipe to fracture said pipe with one sudden impact, and means mounting said first and second members on said force generating means.

2. A pipe cutter comprising a plurality of sharp edge pressure elements adapted to be disposed in circumferential alignment about the periphery of a pipe, support means extending about said pipe and supporting said elements for movement simultaneously radially inwardly of said pipe, first and second members connectable to said support means at spaced locations, a third member, means supporting said first and second members on said third member for movement relative to each other and in one direction to move said elements into tight engagement with said pipe and in the opposite direction to loosen said elements from about said pipe, first means for moving said elements into and holding said elements in tight engagement with said pipe, and impact means on said third member for generating and applying an impact force to said support means through at least one of said members with explosive-like suddenness to suddenly drive said first and second members relative to each other to cause said elements to sever said pipe.

3. A pipe cutter as defined in claim 2 wherein said first means comprises means adjustably connecting said second member to said third member and wherein said first member is movable relative to said second and third members and is driven by said impact means to effect the severing of said pipe.

4. A pipe cutter comprising a plurality of sharp edge pressure elements adapted to be disposed in circumferential alignment about the periphery of a pipe, support means extending about said pipe and supporting said elements for movement simultaneously radially inwardly of said pipe, first and second members connectable to said support means at spaced locations, a third member, means supporting said first and second members on said third member for movement relative to each other and in one direction to move said elements into tight engagement with said pipe and in the opposite direction to loosen said elements from about said pipe, first means for moving said elements into and holding said elements in tight engagement with said pipe, and impact means on said third member for generating and applying an impact force to said support means through at least one of said members with explosive-like suddenness to suddenly drive said first and second members relative to each other to cause said elements to sever said pipe, said first member comprising a piston portion and said impact means comprising means for detonating an explosive charge to drive said piston portion.

5. A pipe cutter as defined in claim 4 wherein said first means comprises means adjustably connecting said second member to said third member and wherein said first member is movable relative to said second and third members and is driven by said impact means to effect the severing of said pipe.

6. A pipe cutter as defined in claim 4 wherein said piston portion is operable in a bore in said third member and wherein said first member has a rod-like portion extending from said piston portion through said second member, said first means comprising a threaded connection between said second member and said third member.

7. A pipe cutter as defined in claim 6 wherein said impact means comprises explosive actuated means.

8. A pipe cutter comprising a plurality of sharp edge pressure elements adapted to be disposed in circumferential alignment about the periphery of a pipe, support means extending about said pipe and supporting said elements for movement simultaneously radially inwardly of said pipe, first and second members connectable to said support means at spaced locations, a third member, means supporting said first and second members on said third member for movement relative to each other and in one direction to move said elements into tight engagement with said pipe and in the opposite direction to loosen said elements from about said pipe, first means for moving said elements into and holding said elements in tight engagement with said pipe and comprising means adjustably connecting said second member to said third member, said first member being movable relative to said second and third members and said third member having abutment means limiting movement of said first member relative to said second and third members in said opposite direction and said first means moving said first member into engagement with said abutment means on the operation of said first means to tighten said elements about said pipe, and impact means on said third member for generating and applying an impact force to said support means through at least one of said members with explosive-like suddenness to suddenly drive said first and second members relative to each other to cause said elements to sever said pipe.

References Cited
UNITED STATES PATENTS

| | | | |
|---|---|---|---|
| 1,665,212 | 4/1928 | La Motte | 225—103 |
| 2,140,338 | 12/1938 | Temple | 83—639 |
| 2,862,295 | 12/1958 | Harding et al. | 225—103 |
| 2,950,035 | 8/1960 | Wheeler | 225—1 |
| 3,187,969 | 6/1965 | Janik | 225—103 |
| 3,269,623 | 8/1966 | Janik | 225—1 |

WILLIAM W. DYER, JR., *Primary Examiner.*

ANDREW R. JUHASZ, *Examiner.*

J. M. MEISTER, *Assistant Examiner.*